(12) United States Patent
Lei et al.

(10) Patent No.: US 11,966,250 B2
(45) Date of Patent: *Apr. 23, 2024

(54) SYSTEM AND METHOD FOR SWITCHING AND ON-DEVICE PORTABILITY OF PERSONALIZED MONITOR PROFILES

(71) Applicant: DELL PRODUCTS L.P., Round Rock, TX (US)

(72) Inventors: Guo Lei, Anchorvale Link (SG); Bee June Tye, Choa Chu Kang (SG)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/719,746

(22) Filed: Apr. 13, 2022

(65) Prior Publication Data
US 2022/0253089 A1 Aug. 11, 2022

Related U.S. Application Data

(63) Continuation of application No. 17/151,411, filed on Jan. 18, 2021, now Pat. No. 11,327,521.

(51) Int. Cl.
*G06F 1/03* (2006.01)
*G06F 3/0482* (2013.01)
*G06F 13/10* (2006.01)
*G06F 13/20* (2006.01)

(52) U.S. Cl.
CPC .............. *G06F 1/03* (2013.01); *G06F 13/102* (2013.01); *G06F 3/0482* (2013.01); *G06F 13/20* (2013.01)

(58) Field of Classification Search
CPC .......... G06F 1/03; G06F 13/102; G06F 13/20; G06F 3/0482
See application file for complete search history.

(56) References Cited

U.S. PATENT DOCUMENTS

| | | | |
|---|---|---|---|
| 10,705,781 B1 | 7/2020 | Guo et al. | |
| 2005/0235221 A1* | 10/2005 | Asoh | G06F 1/3203 715/745 |
| 2007/0132733 A1* | 6/2007 | Ram | G06F 3/03544 345/163 |
| 2009/0023395 A1* | 1/2009 | Chang | G06F 13/102 455/74.1 |
| 2009/0278679 A1 | 11/2009 | Dailey et al. | |
| 2009/0309886 A1* | 12/2009 | Sneed | G06F 3/14 345/520 |
| 2010/0306771 A1* | 12/2010 | Kamay | G06F 9/45558 718/1 |

(Continued)

*Primary Examiner* — Nimesh G Patel
(74) *Attorney, Agent, or Firm* — Larson Newman, LLP

(57) ABSTRACT

A method includes mapping a monitor setting to a shortcut key associated with a human interface device, and translating the monitor setting of a first monitor into binary data based on a lookup table. The method may also generate a human interface device report; embed the binary data in the human interface device report, and store the human interface device report with the binary data in the human interface device. The method may also detect invocation of the shortcut key using the human interface device, match an identifier in the human interface device report associated with the shortcut key; and retrieve the binary data based on the identifier. The method may also transmit the binary data to a second monitor.

20 Claims, 12 Drawing Sheets

(56) References Cited

U.S. PATENT DOCUMENTS

| | | | |
|---|---|---|---|
| 2012/0026202 A1* | 2/2012 | Maciesowicz | G06F 3/14 345/690 |
| 2015/0113181 A1 | 4/2015 | Law et al. | |
| 2021/0247856 A1* | 8/2021 | Wang | G06F 3/016 |

* cited by examiner

| Shortcut Key | Monitor Setting |
|---|---|
| Key 1 + Key 2 | Adjust (increase) a monitor setting |
| Key 3 + Key 2 | Adjust (decrease) a monitor setting |
| Key 1 | Access a monitor preset |
| Key 1 + Key 2 + Key 3 | Access a monitor setting |

| Shortcut Key | Set of Monitor Settings |
|---|---|
| First key | First set of monitor settings |
| First key + Second key | Second set of monitor settings |

SYSTEM AND METHOD FOR SWITCHING AND ON-DEVICE PORTABILITY OF PERSONALIZED MONITOR PROFILES

CROSS-REFERENCE TO RELATED APPLICATION

This application is a Continuation of U.S. patent application Ser. No. 17/151,411 entitled "SYSTEM AND METHOD FOR SWITCHING AND ON-DEVICE PORTABILITY OF PERSONALIZED MONITOR PROFILES," filed on Jan. 18, 2021, the disclosure of which is hereby expressly incorporated by reference in its entirety.

FIELD OF THE DISCLOSURE

The present disclosure generally relates to information handling systems and more particularly relates to switching and on-device portability of personalized monitor profiles.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A method includes mapping a monitor setting to a shortcut key associated with a human interface device, and translating the monitor setting of a first monitor into binary data based on a lookup table. The method may also generate a human interface device report; embed the binary data in the human interface device report, and store the human interface device report with the binary data in the human interface device. The method may also detect invocation of the shortcut key using the human interface device, match an identifier in the human interface device report associated with the shortcut key; and retrieve the binary data based on the identifier. The method may also transmit the binary data to a second monitor.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
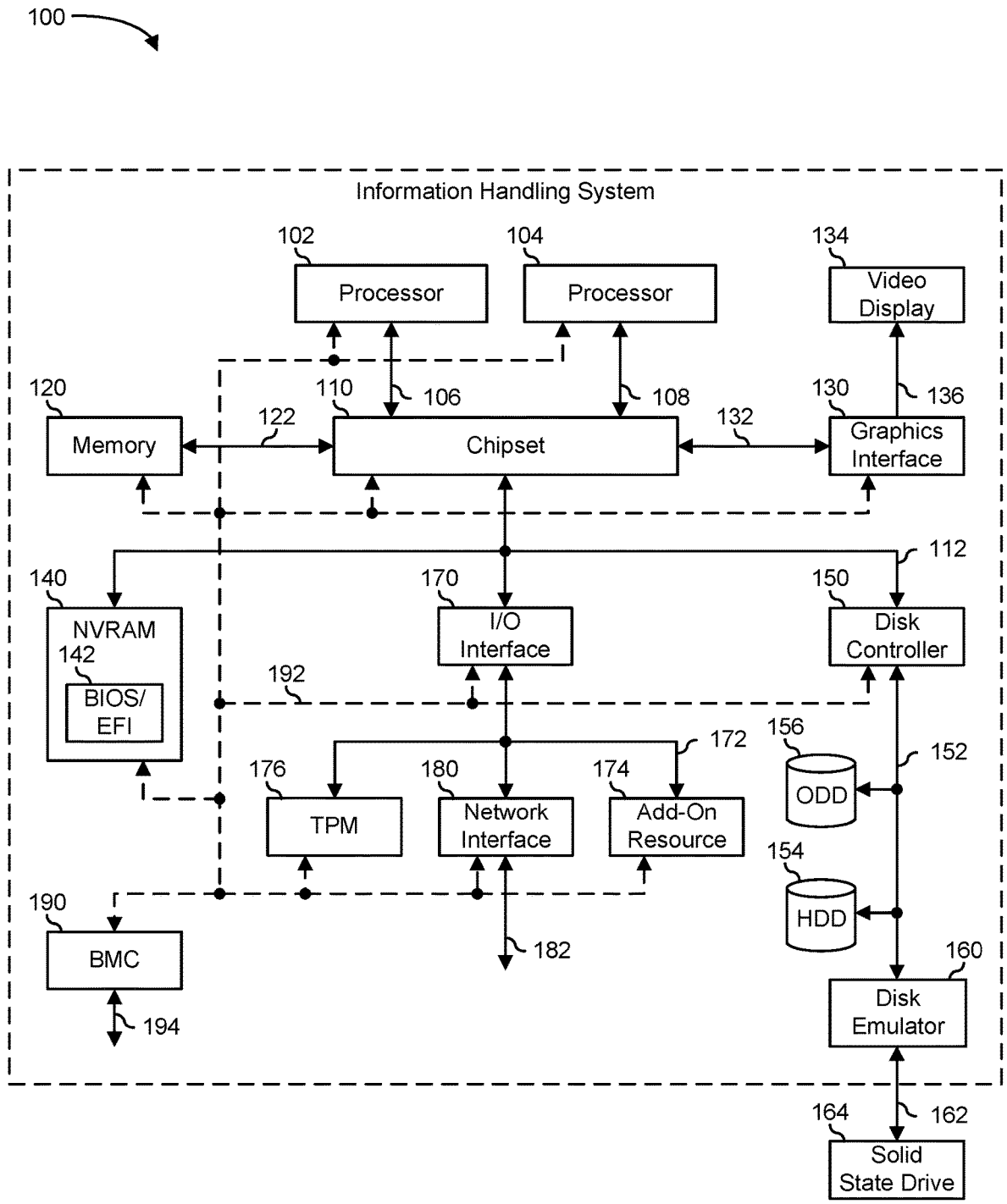
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an I²C bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various I/O devices, such as a keyboard, a mouse, and a video display.

For purpose of this disclosure, information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Monitors typically support multiple predefined and calibrated presets for different types of applications such as productivity, movie, reading, and gaming. Users can access an on-screen display menu using the physical button on the monitor and navigate the menu to select the desired preset. However, accessing an on-screen physical button to quickly change a preset may be cumbersome. In addition, users are typically mobile and may use different monitors. When the users are mobile, the monitor presets do not follow them. Thus each time those users access a different monitor, they have to manually change the monitor settings to apply their personal preference.

Gamers may want to quickly change gaming related settings during a game session. For example, a gamer may want to turn the dark stabilizer level to a different level in a particular game scene of one game. The gamer may also need a quick way to update the settings of a competition monitor. Other users, such as graphic designers and video editors, may record by hand their preferred settings for the high-end monitors that they use to have consistency on color accuracy when switching monitors. For users with multiple monitors, changing the settings on the monitors is typically performed manually which includes accessing a control button and navigating an on-screen display menu to bring up a monitor setting associated with the control button. When the users are mobile, their preferred monitor settings do not follow them to the other monitors. The user has to manually change the monitor settings of the other monitors to apply their preferred monitor settings. To address these and other concerns, the present disclosure provides systems and methods to enable display profile portability that allows dynamic switching of monitor settings. In particular, the monitor settings may be changed, stored, and recalled from a mobile device such as a mouse, a keyboard, etc.

Figure 2:
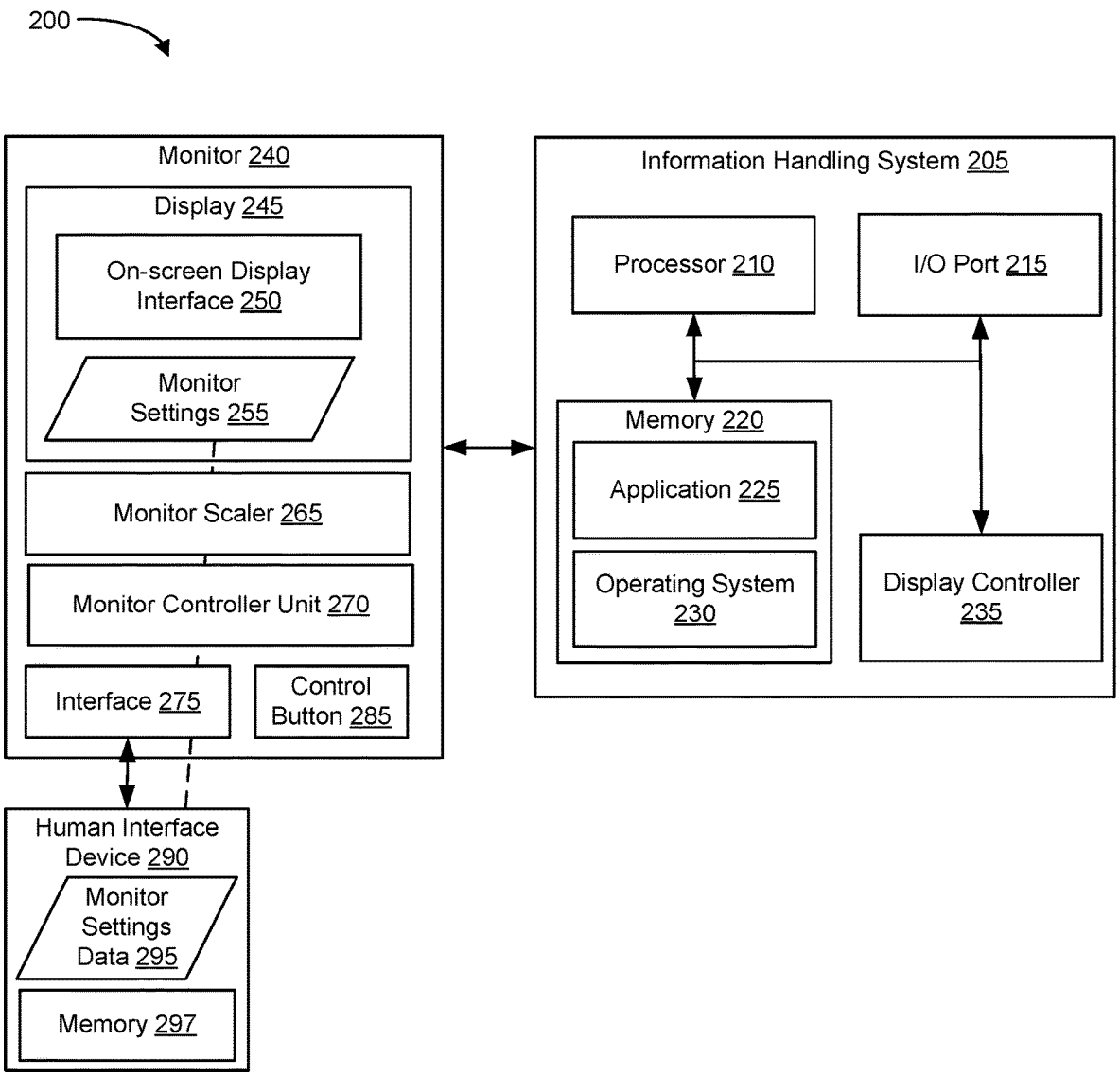
FIG. 2 is a block diagram illustrating a system for portability and switching of personalized monitor profiles, according to an embodiment of the present disclosure.

FIG. 2 shows a system 200 where systems and methods for portability and switching of personalized monitor profiles also referred to as personal profiles may be implemented. The present disclosure enables portability of personal profiles that include one or more monitor settings across monitors by offering a user the ability to save the monitor settings to a human interface device, recall, and then apply the saved monitor settings to another monitor. System 200 includes an information handling system 205, a monitor 240, and a human interface device 290. Information handling system 205 includes a processor 210, an I/O port 215, a memory 220, and a display controller 235. Monitor 240 includes a display 245, a monitor controller unit 270, an interface 275, and a control button 285. Display 245 includes an on-screen display interface 250, and monitor settings 255. Human interface device 290 includes a memory 297 and a monitor settings data 295.

The present disclosure enables portability of monitor settings across monitors by offering the user the ability to save the monitor settings to a human interface device, recall, and then apply the recalled monitor settings. The present disclosure may be implemented using one or more hardware components in updating monitor settings to non-compatible peripheral products via software to generate the mapping of the monitor settings. The software may also be used to change, store, recall, and update the monitor settings to the monitor.

Monitor 240 may be configured to store one or more monitor settings also referred to herein as display settings, such as monitor settings 255. The monitor settings, or simply referred to as settings, include monitor presets, features, display settings, image settings, color settings, etc. For example, monitor settings 255 includes settings for resolution, color depth, and refresh rate. Monitor 240 is configured to provide a number of controls to allow the user to adjust various monitor settings to his preference. The monitor settings may be adjusted via one or more control buttons. As the buttons are adjusted an on-screen display, such as an on-screen display interface 250, shows the numeric values of the monitor settings. The monitor settings may also be adjusted via a user interface of an on-screen display control software, such as on-screen display interface 350 of FIG. 3. Although monitor 240 is shown as a separate device from information handling system 205, monitor 240 can be attached or included in information handling system 205. For example, information handling system 205 may be a laptop, a notebook, or an all-in-one computer.

Display 245 includes a liquid crystal display which receives signals from monitor scaler 265 also simply referred to as a scaler. Monitor scaler 265 is a chipset that may be configured for various functions including decoding various formats, such as video graphics array (VGA), display port (DP), DVI, HDMI, etc. into digital pixel format. An interface may be configured to operate as an upstream port, such as an upstream USB port that is connected to information handling system 205 and used to transfer information between monitor 240 and information handling system 205 via I/O port 215. Interface 275 may be configured to operate as a downstream port to connect human interface device 290 to monitor 240. Although monitor 240 is shown to include one downstream port, multiple downstream ports may be included to connect one or more human interface devices to monitor 240.

Control button 285 may be used to adjust the settings of monitor 240. Control button 285 may be used to choose from a list of preset color modes. For example, the user can choose from standard, movie, game, custom, etc. Control button 285 may be an up and down button, an ok button, or a back button. The up and down button increases and decreases the values of the monitor settings. For example, the up button may be used to increase brightness and the down button may be used to decrease the brightness of the monitor. The ok button is used to confirm the selection. The back button is used to go back to the previous menu. As control button 285 is used, on-screen display interface 250 shows the numeric values of the characteristics as the numeric values change. In addition to adjusting one or more monitor settings, the user can choose a personalization option and create his preferred personalization profile via on-screen display interface 250. Although monitor 240 is shown to have one control button, monitor 240 may include additional control buttons.

Monitor controller unit 270 may be configured to capture and analyze traffic or data stream from human interface device 290, monitor 240, or information handling system 205. For example, monitor controller unit 270 may include a protocol sniffer and protocol analyzer similar to protocol sniffer 720 and protocol analyzer 725 of FIG. 7 accordingly. Human interface device 290 may be configured to connect to monitor 240 via interface 275. Human interface device 290 may be a keypad or keyboard, a mouse, stylus, joystick, pen, voice recognition device, or any other type of device capable of conveying input and/or output. Human interface device 290 may be configured to provide a data storage capacity such as via memory 297 for monitor settings 255, a portion, and/or a translation thereof. For example, monitor settings data 295, which is a translation of monitor settings 255, may be stored at memory 297 according to a defined data structure. Human interface device 290 may be a mouse that provides a pointer-based human interface device for information handling system 205.

Monitor scaler 265 may be configured to generate a data set structure for mapping a shortcut key to a set of monitor settings. The set of monitor settings may be converted to binary data of k-size bits wherein k is a natural number. The length of the binary data may be based on a category of the mapping between the monitor setting to the shortcut key. The shortcut key may be used to update, store, recall, and apply the recalled monitor settings. The shortcut key may be a programmable event such as a mouse click event.

Processor 210 may include any system, device, or apparatus configured to interpret and/or execute program instructions and/or process data, and may include, without limitation, a microprocessor, microcontroller, digital signal processor, application-specific integrated circuit, or any other digital or analog circuitry configured to interpret and/or execute program instructions and/or process data. In some embodiments, processor 210 may interpret and/or execute program instructions and/or process data stored in memory 220, memory 297, and/or another component of information handling system 205. Processor 210 may be similar to processor 102 or processor 104 of FIG. 1.

Memory 220 may be communicatively coupled to processor 210 and may include any system, device, or apparatus configured to retain program instructions and/or data for a period of time such as a computer-readable media. Memory 220 may include a RAM, electrically erasable programmable read-only memory (EEPROM), personal computer memory card international association (PCMCIA) card, flash memory, magnetic storage, opto-magnetic storage, or any suitable selection and/or array of volatile or non-volatile memory that retains data after power to information handling system 205 is turned off. Operating system 230 can provide information associated with on-screen display software 325. In certain implementations, operating system 230 may be used in the implementation of on-screen display software 325 and application 225.

Figure 3:
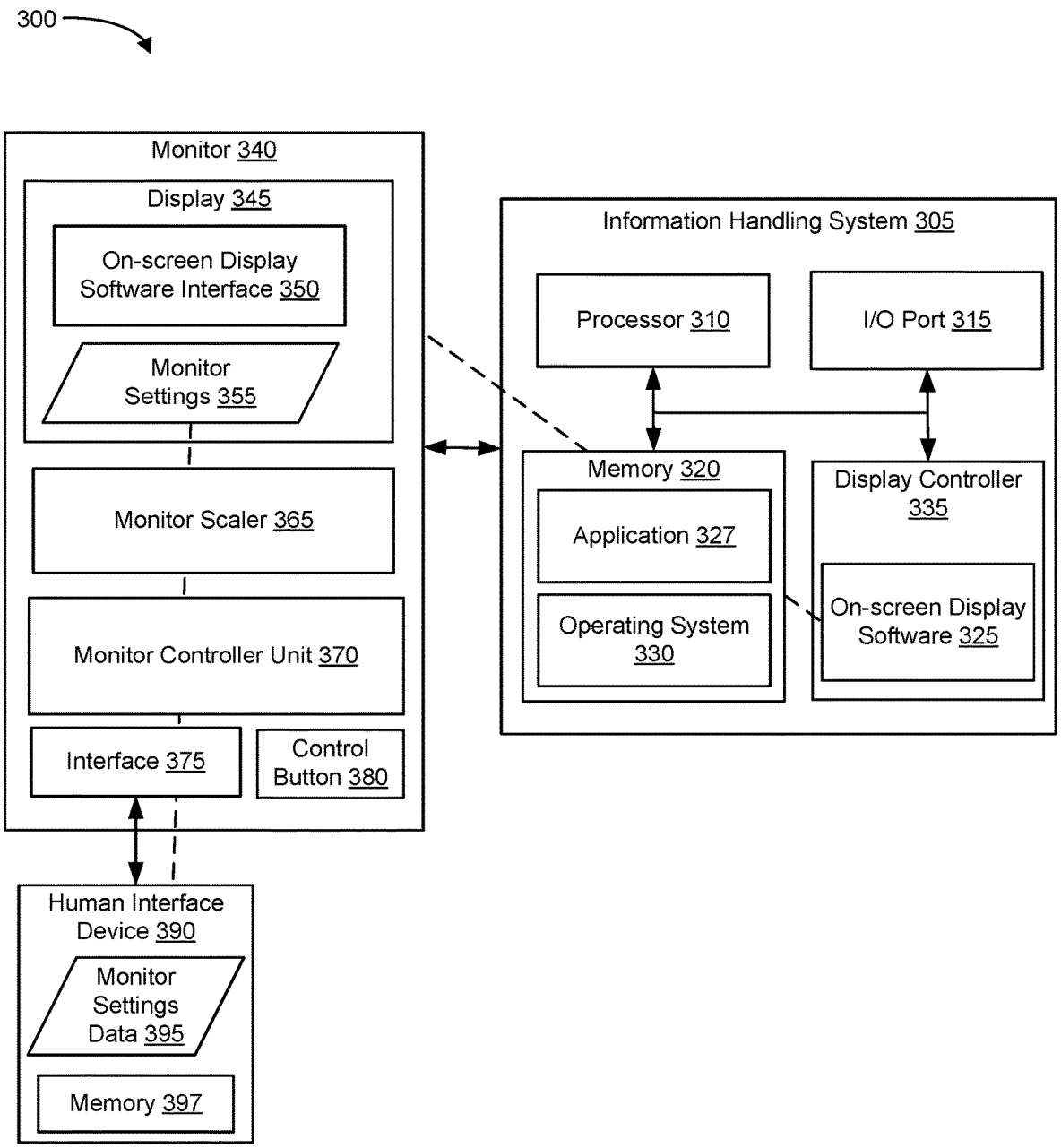
FIG. 3 is a block diagram illustrating a system for portability and switching of personalized monitor profiles, according to an embodiment of the present disclosure.

FIG. 3 shows a system 300 where systems and methods for portability and switching of personal profiles may be implemented. System 300, which is similar to system 200, includes an information handling system 305, a monitor 340, and a human interface device 390. Information handling system 305 includes a processor 310, an I/O port 315, a memory 320, and a display controller 335. Monitor 340 includes a display 345, a monitor scaler 365, a monitor controller unit 370, an interface 375, and a control button 380. Display 345 includes an on-screen display interface 350, and monitor settings 355. Display 345 includes a liquid crystal display which receives signals from monitor scaler 365. Human interface device 390 includes a memory 397 which stores monitor settings data 395.

System 300 enables portability of monitor settings across monitors by offering the user the ability to save the monitor settings to a human interface device, recall, and then apply the recalled monitor settings via on-screen display software 325. The present disclosure may also be implemented to non-compatible peripheral products via on-screen display software 325. System 300 is similar to system 200 and includes various components that are similar to the components of system 200. Monitor 340 is similar to monitor 240 and several of its components. For example, monitor scaler 365 is similar to monitor scaler 265 and control button 380 is similar to control button 285. Monitor controller unit 370 is similar to monitor controller unit 270. Also, interface 275 is similar to interface 375. While monitor settings 355 is similar to monitor settings 255. Human interface device 390 is similar to human interface device 290. Accordingly, memory 397 is similar to memory 297. Also, monitor settings data 395 is similar to monitor settings data 295.

Information handling system 305 is similar to information handling system 205. Accordingly, several components of information handling system305 is similar to several components of information handling system 205. For example, processor 310 is similar to processor 210 while I/O port 315 is similar to I/O port 215. Memory 320 is similar to memory 220. Accordingly, operating system 330 is similar to operating system 230 while application 327 is similar to application 225.

Display controller 335 includes an on-screen display software 325, such as Dell Display Manager, that may be configured to manage monitor 340 via on-screen display interface 350. On-screen display software 325 may be configured to manage and control settings of monitor 340. On-screen display software 325 may be configured to allow the user to adjust the monitor settings via on-screen display interface 350. In one embodiment, on-screen display software 325 sends a command to monitor scaler 365 based on user configuration. Monitor scaler 365 processes the command and updates information at on-screen display interface 350. For example, on-screen display interface 350 may be configured to allow the user to adjust the brightness, contrast, and one or more monitor setting preset modes.

Figure 4:
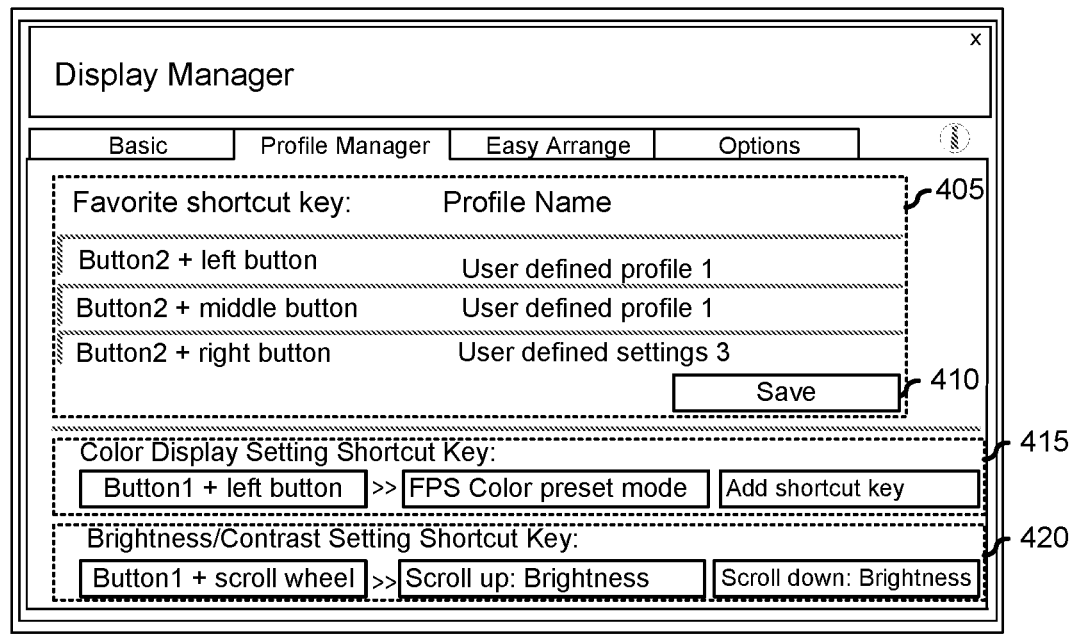
FIG. 4 is a block diagram illustrating an on-screen display interface for portability and switching of personalized monitor profiles, according to an embodiment of the present disclosure.

FIG. 4 shows an on-screen display interface 400, which is an example user interface for defining and saving personal profiles. On-screen display interface 400 also allows a user to associate the personal profiles to a shortcut key. On-screen display interface 400 includes a profile manager section 405, a display setting section 415, and a brightness/contrast setting section 420. Profile manager section 405 includes a save button 410.

In general, on-screen display interface 400 may be used by a user to enable the device portability feature of the personal profiles as adjusted by the user. If the aforementioned feature is enabled, the user may save the personal profiles to the human interface device. The monitor controller unit may listen to events from a human interface device, such as to detect whether the user invoked the shortcut key. Each event may include a human interface device report. If the shortcut key is invoked, the binary data associated with the shortcut key may be analyzed to determine the monitor setting to be applied.

If the human interface device report received from the human interface device includes an identifier that matches a predefined human interface device report identifier in the human interface device report, then the monitor controller unit reads binary data also referred herein as encoded data from the human interface device report and forwards the encoded data to the monitor scaler for processing. The monitor scaler determines one or more monitor settings associated with the encoded data by referencing one or more lookup tables. The determined monitor settings may be the personal profiles or a set of monitor settings that were stored in the human interface device when the user enabled the device portability feature. The personal profiles or the set of monitor settings are associated with a shortcut key which is then associated with a predefined human interface device report identifier. For example, the brightness and/or contrast setting of the monitor may be adjusted by the user according to his preference, associated with a shortcut key, and saved as a personal profile.

The personal profile may be stored in a non-volatile memory of a portable human interface device. When the shortcut key may be a programmable feature of the human interface device. For example, the shortcut key may include pressing a forward button and movement of the scroll wheel to increase or decrease the values of the monitor settings accordingly. After determining the personal profile and/or the set of monitor settings, the monitor scaler changes or updates the current settings of the monitor based on the personal profile or the set of monitor settings, restoring the monitor to the user's personal preferences. The on-screen display control software may also be updated with the user's personalized monitor profiles and/or the set of monitor settings.

The profile manager tab may include a profile manager section 405 that includes one or more shortcuts and an associated profile. The profile may be associated with user-defined preset monitor settings also referred to as personal profiles. Profile manager section 405 also includes a save button 410 that is typically greyed out if there no update to the shortcuts and/or profiles. Save button 410 may also be greyed out if there is no human interface device wherein the data associated with profile manager section 405 can be saved to. Save button 410 may also be greyed out of the portability feature of the personal profile and/or the set of monitor settings is disabled. Save button 410 may be enabled and can be used by the user to save the personal profiles and/or the set of monitor settings in profile manager section 405. The shortcut keys allow the user to switch between profiles, wherein each personal profile is associated with a set of monitor settings. Display setting section 415 may allow a user to associate a shortcut key to a display or monitor setting. The user may add, update, or delete the shortcut key and associated monitor setting or display setting preset mode. Brightness/contrast setting section 420 may allow a user to associate a shortcut key to a brightness/contrast setting value.

On-screen display interface 400 may be part of a system or method that allows a user to change the monitor settings and/or presets and save the changed monitor settings and/or presets to a human interface device. For example, the user may perform calibrate the color or the display. The calibration may include adjustment of one or more monitor settings, such as gamma, brightness and contrast, and color balance. After the calibration, the user may save the adjusted monitor settings on a portable human interface device. The adjusted monitor settings may be included in the personal profiles or user-defined profiles. For the user who has a multiple monitor setup, such as connected by a keyboard, video, and mouse (KVM) switch, the user can adjust the settings of one of the monitors, save it on the portable human interface device such as a mouse, and then proceed to recall and apply the adjusted monitor settings to the rest of the monitors. This allows the user to quickly have the same monitor settings to all the monitors.

Figure 5:
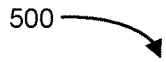
FIG. 5 is a table of a shortcut key mapping for portability and switching of personalized monitor profiles, according to an embodiment of the present disclosure.

FIG. 5 shows a shortcut key mapping table 500 that shows an example mapping of a shortcut key to a monitor setting. Shortcut key mapping table 500 is a limited example of a shortcut key mapping to one or more monitor settings and does not limit the present disclosure. The shortcut key may be invoked by pressing one or more keys or a sequence of keys. The shortcut key may often be referred to as hotkeys, shortcut keys, or the like. The key may be a programmable button in a mouse, a keyboard key, a programmable button in a game controller or joystick, etc. A single key as well as a combination of more than two keys may be mapped to one or more monitor settings or monitor presets. For example, the shortcut key may be a click of the mouse. The mapped monitor setting may be accessed or adjusted when the shortcut key is invoked. The shortcut key may also be mapped to a set of monitor settings. The set of monitor presets or monitor settings include a combination of color or monitor preset with dark stabilizer, high dynamic range (HDR) ON, fast response time, etc.

The first two rows of shortcut key mapping table 500 shows a first category mapping which maps a shortcut key to an adjustable monitor setting, such as the brightness or contrast of the monitor. The shortcut key may include moving a wheel such as a scroll wheel to increase and/or decrease the brightness or contrast relative to the movement of the scroll wheel. For example, key 1 may be a programmable button such as a forward button of a mouse or a keyboard key while key 2 may be moving a scroll wheel of the mouse. Moving the scroll wheel upwards may increase the brightness or contrast, while moving the scroll wheel downwards may decrease the brightness or contrast. Key 3 may be a backward button of the mouse while key 4 may be a left, middle, or right button of the mouse. A monitor setting or monitor preset may include a color space preset, monitor mode, or game features. A color space preset includes standard red green blue (sRGB), Adobe® RGB, Digital Cinema Initiatives DCI-P3, etc. The monitor settings may include various monitor modes such as warm, cool, frames per second (FPS), read, movie, comfort-view, etc. The monitor settings also include one or more game features such as color gamma, dark stabilizer, response time, frame rate (FR), timer, HDR. Various combinations of the keys and monitor settings or monitor presets in addition or lieu of the above may be used. Table 1 below shows an example mapping of shortcut keys and associated monitor settings.

TABLE 1

Mapping Table

| Shortcut Key | Monitor Setting |
|---|---|
| Programmable button 1 (Forward button) + scroll wheel | Brightness level adjustment. Mapping logical maximum to maximum brightness and logical minimum to minimum brightness of the monitor |
| Programmable button 2 (Backward button) + scroll wheel | Contrast level adjustment. Mapping logical maximum to maximum contrast and logical minimum to minimum contrast of the monitor |

A monitor setting may be encoded, converted, or translated to a string of binary data that can be stored in the human interface device and understood by the human interface device, monitor, and/or information handling system. The present disclosure may encode or translate a monitor setting an 8-bit byte of data. Based on the first row of the mapping table 1 above, when a user presses the first programmable button and/or is released with a movement of a scroll wheel of a mouse, the monitor's brightness level setting may be adjusted. The adjustment for the brightness level may be translated or encoded using data byte as shown in table 2 below. The logical maximum may be mapped to the maximum brightness setting while the logical minimum may be mapped to the minimum brightness setting of the monitor. The binary data may be stored in the memory of the human interface device. The binary data may also be included in the human interface device report and/or a human interface device report descriptor. For example, the human interface device report descriptor may include the following parameters and values: USAGE (brightness), USAGE_PAGE (button 1, wheel), LOGICAL_MINIMUM (−127), and LOGICAL MAXIMUM (127).

TABLE 2

Brightness Level Encoding

| | Bit-7 | Bit-6 | Bit-5 | Bit-4 | Bit-3 | Bit-2 | Bit-1 | Bit-0 |
|---|---|---|---|---|---|---|---|---|
| Byte-1 | Brightness (Logical maximum: +127, logical minimum: −127) | | | | | | | |

Based on the second row of the mapping table 1 above, when the user presses the second programmable button and/or released with a movement of the scroll wheel of the mouse, the monitor contrast level setting may be adjusted. The adjustment for the contrast level may be translated or encoded using one data byte as shown in table 3 below. The logical maximum may be mapped to the maximum contrast setting while the logical minimum may be mapped to the minimum contrast setting of the monitor. Similar to the example above, the encoding may be stored in the human interface device and included in the human interface device report and/or human interface device report descriptor. For example, the human interface device report descriptor may include the following parameters and values: USAGE (contrast), USAGE_PAGE (button 2, wheel), LOGICAL_MINIMUM (−127), LOGICAL MAXIMUM (127).

TABLE 3

Contrast Level Encoding

| | Bit-7 | Bit-6 | Bit-5 | Bit-4 | Bit-3 | Bit-2 | Bit-1 | Bit-0 |
|---|---|---|---|---|---|---|---|---|
| Byte-1 | Contrast (Logical maximum: +127, logical minimum: −127) | | | | | | | |

The third and fourth rows of shortcut key mapping table 500 shows a second category mapping which maps a shortcut key to a monitor preset or a monitor setting for quick access to the monitor preset or monitor setting. For the second category, we use a look-up table. A first shortcut key may be assigned to a monitor preset, while a second shortcut key may be assigned to a monitor setting. For example, a first programmable button plus a left/middle/right button may be used in combination as a first shortcut key. The encoding for the second category may use an 8-bit data byte. With the number of bit combinations, it is possible to encode distinct two hundred and fifty-six monitor settings as shown in table 4 below. Each level may be associated with a monitor preset, monitor setting, or feature. For example, the first level may be assigned to a first monitor preset, the second level may be assigned to a second monitor preset, the third level may be assigned to a third monitor preset. Monitor presets may include preset monitor settings such as "comfort view", FPS, RPG, etc. The user may select a feature, monitor setting, or monitor preset from the look-up table and assign it to a shortcut key.

TABLE 4

Monitor Settings Encoding

| | Bit-7 | Bit-6 | Bit-5 | Bit-4 | Bit-3 | Bit-2 | Bit-1 | Bit-0 |
|---|---|---|---|---|---|---|---|---|
| Byte-1 | Monitor individual settings (maximum: 256 settings) | | | | | | | |

Figure 6:
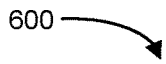
FIG. 6 is a table of a shortcut key mapping for portability and switching of personalized monitor profiles, according to an embodiment of the present disclosure.

FIG. 6 shows a shortcut key mapping table 600 which shows an example shortcut key mapping to a set of monitor settings. The set of monitor settings may include one or more monitor settings, monitor presets, or features. Shortcut key mapping table 600 is a limited example of a shortcut key(s) mapping to one or more monitor settings, and translation to a format storable at a human interface device and does not limit the present disclosure.

Shortcut key mapping table 600 shows a third category mapping which maps a shortcut key to a set of monitor settings to quickly access and/or adjust one or more monitor settings. The set of monitor settings may be translated or encoded by using two bytes or sixteen bits of data for maximum configuration flexibility as shown in table 5 below. In one embodiment, the monitor presets are assigned four bits, to accommodate up to sixteen monitor presets with some bits reserved for scalability. The color presets may also be assigned four bits, to accommodate up to sixteen color spaces with some bits also reserved for scalability. Some gaming features such as HDR on/off, FR on/off, response time, and dark stabilizer may be assigned either one or two bits. Table 6 below is a lookup table that shows encoding associated with the monitor presets. Table 7 shows the encoding associated with the color space presets. Table 8 shows the encoding associated with game/color features. Table 9 shows an example of a shortcut key mapping table, wherein a shortcut key is mapped to a set of monitor settings and encoding of the monitor settings based on lookup tables 6-8. The encoding may refer to the conversion or transaction of the monitor setting to binary data. The tables shown are examples for illustration and do not limit the present disclosure.

TABLE 5

Set of Monitor Settings Encoding

| | Bit-7 | Bit-6 | Bit-5 | Bit-4 | Bit-3 | Bit-2 | Bit-1 | Bit-0 |
|---|---|---|---|---|---|---|---|---|
| Byte-1 | Color Presets (with reserved) | | | | | Monitor Presets (with reserved) | | |
| Byte-2 | | | HDR | FR | | Response Time | | Dark Stabilizer |

TABLE 6

Monitor Preset Lookup Table

| Monitor Preset | Hex (Byte-1 lower order) (Bit-0 to Bit-3; masking Bit-4 to Bit-7) |
|---|---|
| Comfort view | 0x0 |
| FPS | 0x1 |
| RPG | 0x2 |
| RTS | 0x3 |
| Movie | 0x4 |
| Read | 0x5 |
| Warm | 0x6 |
| Cool | 0x7 |
| Custom 1 | 0x8 |
| Custom 2 | 0x9 |
| Custom 3 | 0xA |
| Reserved | 0x0B to 0xFF |

TABLE 7

Color Preset Lookup Table

| Color Space Preset | Hex (Byte-1 higher order) (Bit-4 to Bit-7; masking Bit-0 to Bit-3) |
|---|---|
| DCI-P3 | 0x0000xxxx |
| BT.709 | 0x0001xxxx |
| BT.2020 | 0x0010xxxx |

TABLE 7-continued

Color Preset Lookup Table

| Color Space Preset | Hex (Byte-1 higher order) (Bit-4 to Bit-7; masking Bit-0 to Bit-3) |
| --- | --- |
| sRGB | 0x0011xxxx |
| AdobeRGB_D65 | 0x0100xxxx |
| AdobeRGB_D50 | 0x0101xxxx |
| HDR10 | 0x0110xxxx |
| HLG | 0x0111xxxx |
| Custom 4 | 0x1000xxxx |
| Custom 5 | 0x1001xxxx |
| Custom 6 | 0x1010xxxx |
| Reserved | 0x1011xxxx to 0x1111xxxx |

TABLE 8

Game/Color Feature Lookup Table

| Game/Color Feature | Attributes |
| --- | --- |
| Dark Stabilizer (2-bits) | Level 0 (0x00) |
| | Level 1 (0x01) |
| | Level 2 (0x10) |
| | Level 3 (0x11) |
| Response Time (2-bits) | Extreme (0x00xx) |
| | Fast (0x01xx) |
| | Normal (0x10xx) |
| Framerate on-screen (FR) | On |
| | Off |
| High-Dynamic-Range (HDR) | On |
| | Off |

TABLE 9

Set of Monitor Settings Encoding

| Shortcut Key | Set of Monitor Settings | Encoding |
| --- | --- | --- |
| Programmable button 1 (forward button) + left button | FPS game mode + extreme response time + dark stabilizer level 3 + framerate set to ON | Byte-1 = 0x00000001; Byte-2 = 0x00010011 |
| Programmable button 1 (forward button) + middle button | RTS game mode + fast response time + dark stabilizer level 1 | Byte-1 = 0x00000011; Byte-2 = 0x00000101 |
| Programmable button 1 (forward button) + right button | RPG game mode + HDR set to ON + fast response time + dark stabilizer level 0 | Byte-1 = 0x00000010; Byte-2 = 0x00100100 |

Figure 7:
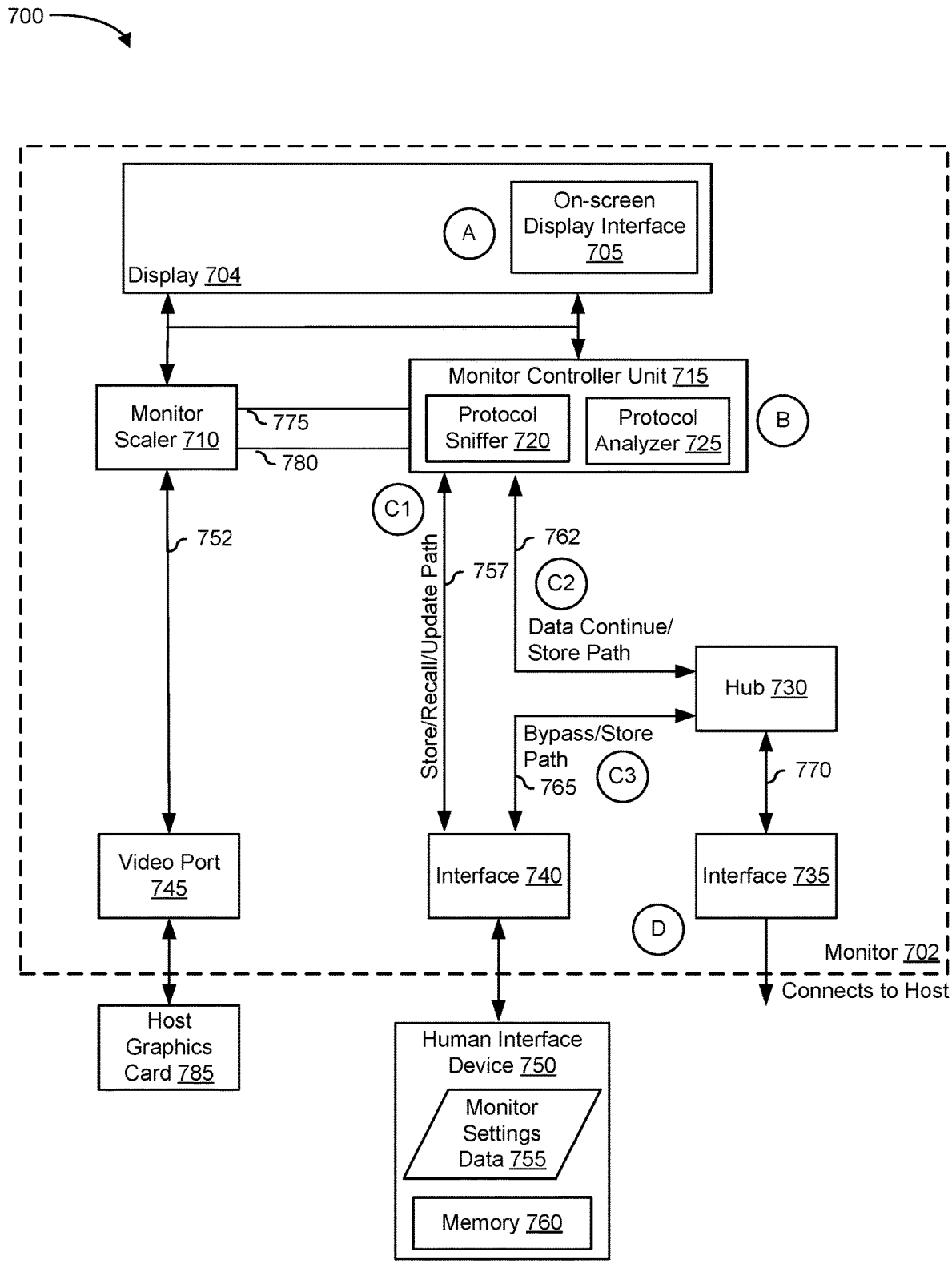
FIG. 7 is a block diagram illustrating a system for portability and switching of personalized monitor profiles, according to an embodiment of the present disclosure.

FIG. 7 shows a system 700 where systems and methods for switching and portability of personalized monitor profiles may be implemented. In particular, system 700 shows the flow of data between various components of a monitor 702 and a human interface device 750. System 700 includes monitor 702, a host graphics card 785, and human interface device 750. Monitor 702 includes a display 704, a monitor scaler 710, a monitor controller unit 715, a hub 730, an interface 735, an interface 740, and a video port 745. Display 704 includes an on-screen display interface 705. Monitor controller unit 715 includes a protocol sniffer 720 and a protocol analyzer 725. Human interface device 750 includes a memory 760 and a monitor settings data 755.

Monitor scaler 710 is connected to monitor controller unit 715 via an interface 775 and an interface 780. Monitor scaler 710 is connected to video port 745 via an interface 752. Monitor controller unit 715 is connected to interface 740 via an interface 757. Monitor controller unit 715 is connected to hub 730 via an interface 762. Hub 730 is connected to interface 740 via interface 765. Hub 730 is connected to interface 735 via interface 770.

FIG. 7 is annotated with a series of letters A-C1/C3-D. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

A user updates the monitor settings using either the hardware method or the software method. In one embodiment, at stage A1, the user updates the monitor settings using the hardware method, and then the user may use one or more control buttons of monitor 702. On-screen display interface 705 may show the values of the monitor settings as the user adjusts the settings using the control buttons. On-screen display interface 705 is similar to on-screen display interface 250 of FIG. 2. In another embodiment, at stage A2 the user updates the monitor settings using the software method, then the user updates the monitor settings via on-screen display interface 705 which is associated with an on-screen display control software. In this embodiment, on-screen display interface 705 is similar to on-screen display interface 350 of FIG. 3. After the update of the monitor settings in both embodiments, the user may save the updated monitor settings to memory 760 of human interface device 750 by pressing a save button at the on-screen display interface 705. The save button is similar to save button 410 of FIG. 4.

At stage B, monitor controller unit 715 translates, converts, or encodes the updated monitor settings to binary data generating monitor settings data 755. In one embodiment, at stage C1, monitor controller unit 715 transmits monitor settings data 755 to human interface device 750 via interface 757 where monitor settings data 755 is stored at memory 760. In another embodiment, at stage C2, monitor controller unit 715 transmits monitor settings data 755 to hub 730 prior to transmitting monitor settings data 755 to human interface device 750 for storage at stage C3. At stage D, the updated monitor settings are communicated to an information handling system via interface 735 through interface 770.

Figure 8:
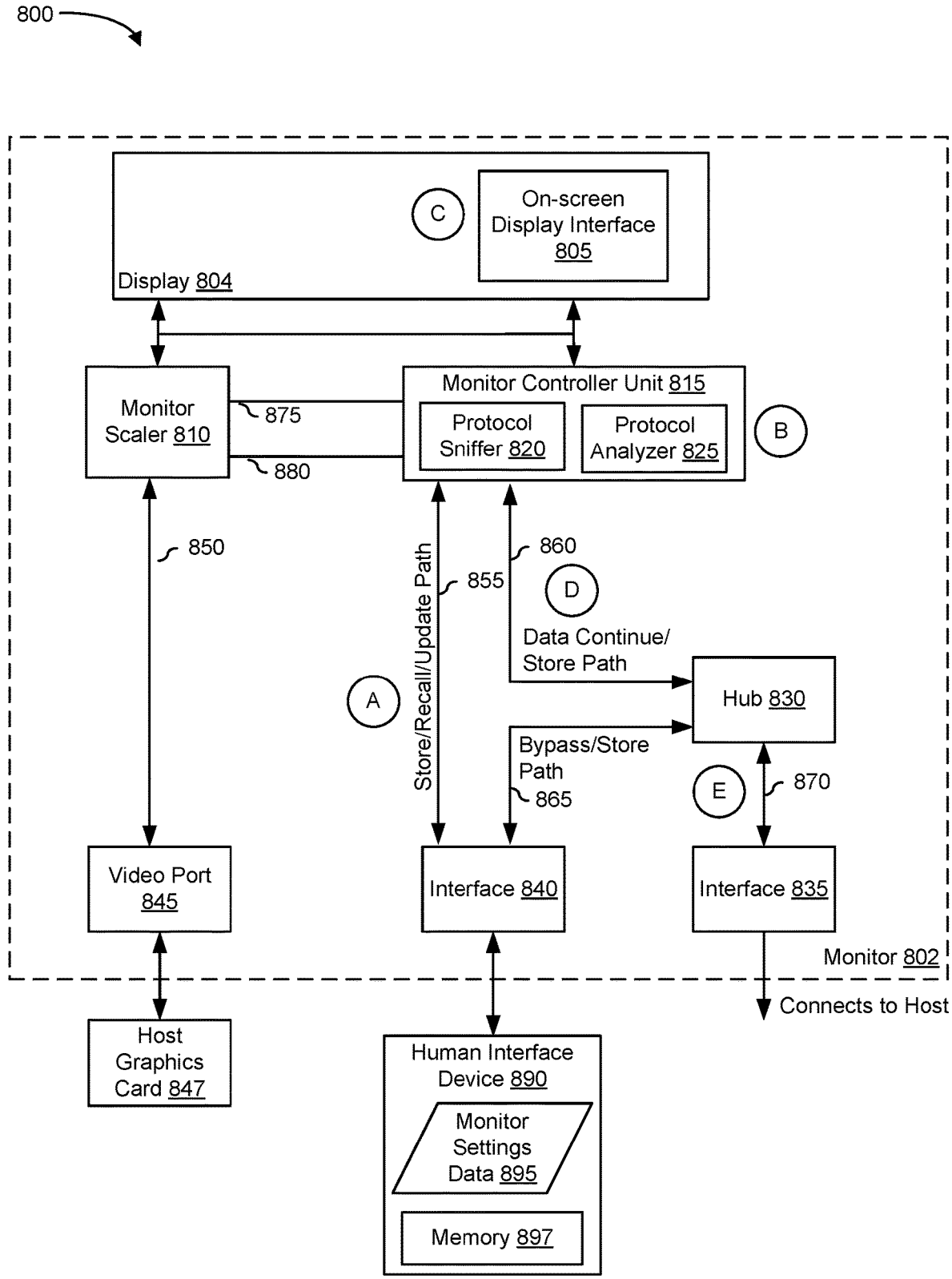
FIG. 8 is a block diagram illustrating a system for portability and switching of personalized monitor profiles, according to an embodiment of the present disclosure.

FIG. 8 shows a system 800 where systems and methods for switching and portability of personalized monitor profiles may be implemented. In particular, system 800 shows the flow of data between various components of a monitor 802 and a human interface device 890. System 800 includes a monitor 802, human interface device 890, and a host graphics card 847. Monitor 802 includes a display 804, a monitor scaler 810, a monitor controller unit 815, a hub 830, an interface 835, an interface 840, and a video port 845. Display 804 includes an on-screen display interface 805. Monitor controller unit 815 includes a protocol sniffer 820, and a protocol analyzer 825. Human interface device 890 includes a memory 897 and a monitor settings data 895.

Monitor scaler 810 is connected to monitor controller unit 815 via an interface 875 and an interface 880. Monitor scaler 810 is connected to video port 845 via an interface 850. Monitor controller unit 815 is connected to interface 840 via an interface 855. Monitor controller unit 815 is connected to hub 830 via an interface 860. Hub 830 is connected to interface 840 via interface 865. Hub 830 is connected to interface 835 via interface 870.

FIG. 8 is annotated with a series of letters A—E. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, subsequent to the connection of human interface device 890 to monitor 802 via interface 840, protocol sniffer 820 may receive monitor settings data 895 from human interface device 890. Protocol sniffer 820 may be a USB protocol sniffer that intercepts data packets received from interface 840. Interface 840 may be a USB interface similar to interface 275 of FIG. 2. Interface 855 may be configured as a storage, recall, and update path for the data packets from devices connected to interface 840.

At stage B, protocol analyzer 825 may process the data packets to determine if the data packets include a human interface device report identifier that matches an identifier in a human interface device report stored in the human interface device plugged in at interface 840. If protocol analyzer 825 identifies a matched human interface device report identifier, then protocol analyzer 825 may retrieve the transaction data from the data packets and send it to monitor scaler 810 via interface 875 or interface 880. The transaction data is the encoding associated with the human interface device report identifier which may be decoded to be applied to monitor 802 or display 804. Interface 875 may be a serial communication bus such as an I²C bus while interface 880 may be a parallel communication bus such as a general-purpose I/O bus (GPIO).

At step C, monitor scaler 810 determines the monitor setting to be updated based on the transaction data by mapping the transaction data to a monitor setting by referencing a lookup table and/or mapping table. The transaction data may be mapped to a set of monitor settings and may reference more than one lookup table and/or mapping table. The lookup table and/or mapping table may be similar to table 6-8 above. Monitor scaler 810 applies the monitor settings and refreshes display 804. Monitor scaler 810 also updates the on-screen display interface 805, which may be associated with hardware components for adjusting monitor settings. In another embodiment, on-screen display interface 805 may be associated with an on-screen display control software.

At stage D, protocol sniffer 820 forwards the transaction data and/or the monitor settings via interface 860 to hub 830, which may be a USB hub. Interface 860 may be configured as a storage and update path for the data packets, monitor settings data 895, or the transaction data from monitor controller unit 815. While interface 865 may be configured as a storage/bypass path for data packets, monitor settings data 895, or the transaction data from monitor controller unit 815. At stage E, hub 830 forwards the monitor settings and/or transaction data to the host via interface 835 through interface 870. The monitor settings information of an on-screen display menu may be updated based on the monitor settings, transaction data, and/or data packets received by the host. In another embodiment, the monitor settings information of an on-screen display control software may be updated based on the monitor settings and/or data packets received by the host.

Figure 9:
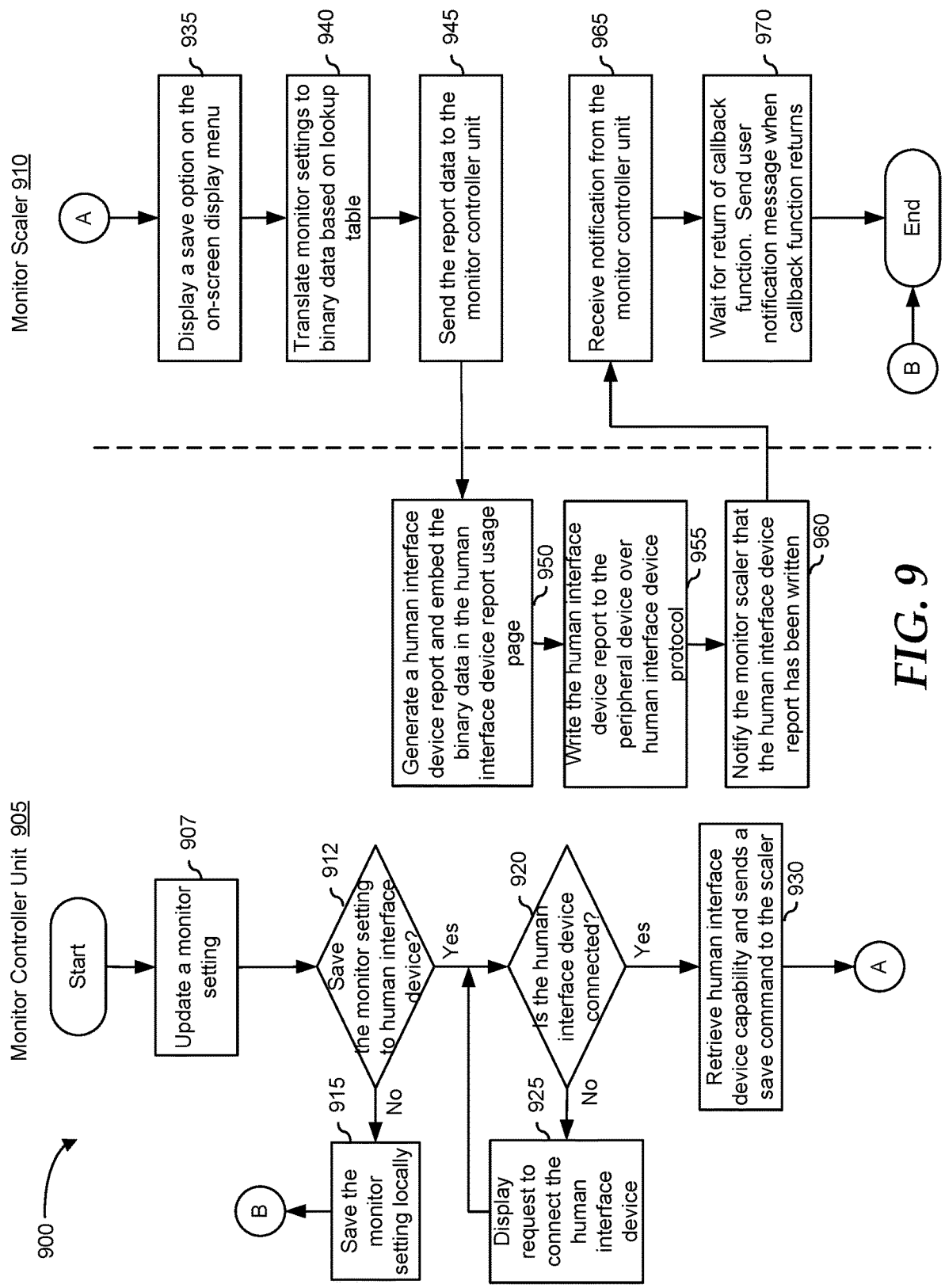
FIG. 9 is a flowchart illustrating a method for portability and switching of personalized monitor profiles, according to an embodiment of the present disclosure.

FIG. 9 illustrates a method 900 for storing personal profiles in a human interface device. Method 900 may be a hardware method which is a method that can be performed with one or more hardware components of system 200 of FIG. 2. In particular, method 900 can be performed by a monitor controller unit 905 and a monitor scaler 910 which are similar to monitor controller unit 270 and monitor scaler 265 of FIG. 2 respectively. Monitor controller unit 905 can perform block 907, decision block 912, block 915, decision block 920, block 925, block 930, block 950, block 955, and block 960. Monitor scaler 910 can perform block 935, block 940, block 945, block 965, and block 970. While embodiments of the present disclosure are described in terms of components of system 200 of FIG. 2, it should be recognized that other systems may be utilized to perform the described method. One of skill in the art will appreciate that this flowchart explains a typical example, which can be extended to advanced applications or services in practice.

Method 900 typically starts at block 907 where a user updates a monitor setting. The user may update the monitor setting according to his personal preference using one or more control buttons of the monitor and/or an on-screen display menu. The method proceeds to decision block 912 where the method determines whether to save the monitor setting preferences at a human interface device. If the method determines that the monitor settings are to be saved at the human interface device, then the "YES" branch is taken and the method proceeds to decision block 920. If the method determines that the monitor settings are not to be saved at the human interface device, then the "NO" branch is taken and the method proceeds to block 915 where the method save the monitor setting locally and exits the on-screen display menu or the on-screen di splay interface.

At decision block 920, the method determines whether the human interface device is connected to the monitor or the information handling system. If the human interface device is connected, then the "YES" branch is taken and the method proceeds to block 930. If the human interface device is not connected, then the "NO" branch is taken and the method proceeds to block 925 where the method displays a notification that requests the user to connect the human interface device. At block 930, the method determines the capability of the human interface device. The method may retrieve information from the human interface device to determine its capability. The method may then transmit the information to monitor scaler 910. The method may also send a save command to monitor scaler 910.

At block 935, the monitor scaler 910 displays a save option on the on-screen display menu. For example, monitor scaler 910 activates a greyed out inactive button on the on-screen display menu or the on-screen display interface. The save button may be used by the user to store the monitor settings in the human interface device. The method proceeds to block 940.

At block 940, monitor scaler 910 translates or converts the monitor settings into binary data that conforms to the specification requirements of the protocol associated with the human interface device to which the data will be saved. The binary data may be based on one or more lookup tables, such as tables 6-8 above. Some monitor settings may be stored in 8-bit single data bytes while other monitor settings may be stored in two bytes. The method proceeds to block 945 where it sends the binary data to the monitor controller unit 905 with a notification callback function.

At block 950, the method generates a human interface device report descriptor and embeds the binary data in the usage page of the human interface device report descriptor usage page. The binary data may be assigned to a shortcut key. The method proceeds to block 955 where it sends the human interface device report to the human interface device over a human interface device protocol. The human interface device may send a response when the human interface device report is received. For example, a mouse may respond with a lighting animation when the human interface device report is received.

The method proceeds to block 960 where monitor controller unit 905 transmits a notification to monitor scaler 910 after successfully writing the human interface device report in the human interface device. At block 965, monitor scaler 910 receives the notification transmitted by monitor controller unit 905. Monitor scaler 910 waits for the return of the callback function. When the callback function returns, monitor scaler 910 displays notification that the updated monitor settings have been saved and associated with a shortcut key at block 970.

Figure 10:
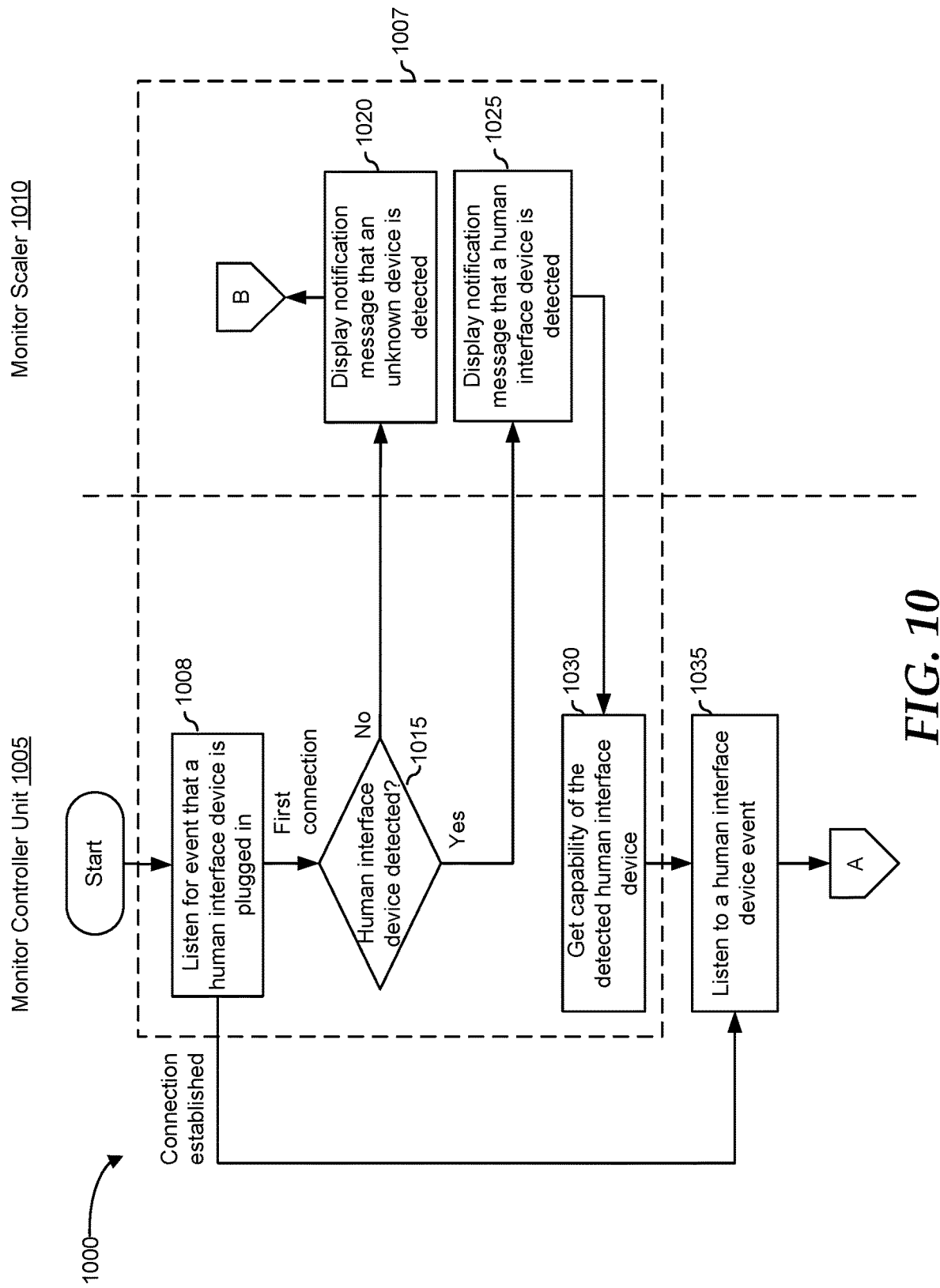
FIGS. 10 and 11 are flowcharts illustrating a method for portability and switching of personalized monitor profiles, according to an embodiment of the present disclosure.

FIG. 10 shows a flowchart of a method 1000 for recalling monitor settings from a human interface device and applying the monitor settings to one or more monitors. Method 1000 may be performed by a monitor controller unit 1005 and a monitor scaler 1010 which are similar to monitor controller unit 270 and monitor scaler 265 of FIG. 2. In particular, monitor controller unit 1005 may perform block 1007 and block 1035. Block 1007 includes block 1008, decision block 1015, and block 1030. Monitor scaler 1010 may perform block 1020 and block 1025. While embodiments of the present disclosure are described in terms of components of system 200 of FIG. 2, it should be recognized that other systems may be utilized to perform the described method. One of skill in the art will appreciate that this flowchart explains a typical example, which can be extended to advanced applications or services in practice.

At an initial connection of a human interface device, the method performs block 1007. At subsequent connections of the human interface device, the method typically starts at block 1035. Block 1007 may be performed once for the human interface device. Block 1007 typically starts at block 1008, where the method listens for a human interface device event. The human interface event may be generated by the human interface device when it is plugged into a port or an interface of the monitor or information handling system. The human interface device event may include a report associated with the human interface device.

The method proceeds to decision block 1015, where the method determines whether the human interface device is detected. If the human interface device is detected, then the "YES" branch is taken and the method proceeds to block 1025. If the human interface device is not detected, then the "NO" branch is taken and the method proceeds to block 1020. At block 1020, the method displays a notification that an unknown device is detected. At block 1025, the method displays a notification that the human interface device is detected. At block 1030, the method gets the capability of the detected human interface device. The method proceeds to block 1035. At block 1035, the method listens for a human interface device event. Because a human interface event may also be generated when a shortcut key is invoked by the user, the method listens for the invocation of a shortcut key. The method proceeds to decision block 1105 of FIG. 11.

Figure 11:
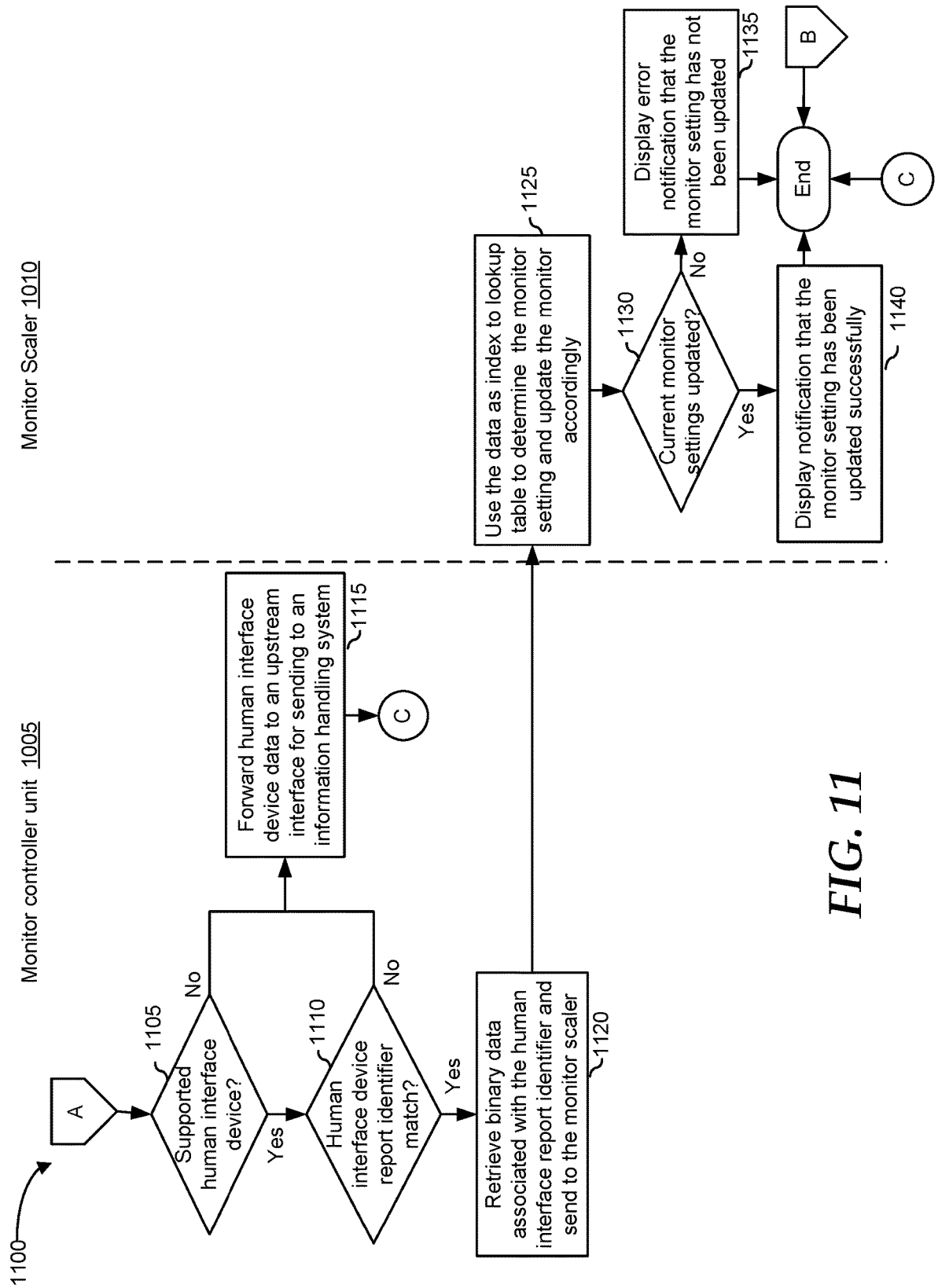

FIG. 11 shows a flowchart of a method 1100 which is a continuation of method 1000 of FIG. 10. At decision block 1105, the method determines whether the human interface device is supported. The method may determine whether the human interface device is a supported device based on device information from the human interface device report. If the human interface device is a supported device then the "YES" branch is taken and the method proceeds to decision block 1110. If the human interface device is not supported the "NO" branch is taken and the method proceeds to block 1115.

At decision block 1110, the method may analyze the human interface device report included in the human interface device event and determine whether a report identifier in the human interface device report matched a predefined report identifier. If the report identifier is a match, then the "YES" branch is taken and the method proceeds to block 1120. If the report identifier is not a match, then the "NO" branch is taken and the method proceeds to block 1115. At block 1120, the method may retrieve the binary data or transaction data from the human interface device report that is associated with the matched report identifier and send the binary data or the transaction data to the monitor scaler. The method proceeds to block 1125.

At block 1125, the method may determine one or more monitor settings from the retrieved data based on look-up tables. The method may use the encoded data as an index to determine the associated one or more monitor settings. After determining the one or more monitor settings, the method updates the one or more settings of the monitor accordingly. The method proceeds to decision block 1130.

At decision block 1130, the method determines whether the setting(s) of the monitor has been updated successfully. If the setting(s) of the monitor has been updated, then the "YES" branch is taken and the method proceeds to block 1140. If the setting(s) of the monitor has not been updated, then the "NO" branch is taken and the method proceeds to block 1135. At block 1135, the method displays a notification that the setting(s) has not been updated. At block 1140, the method displays a notification that the setting(s) has been updated. After blocks 1135 and 1140, the method ends.

Figure 12:
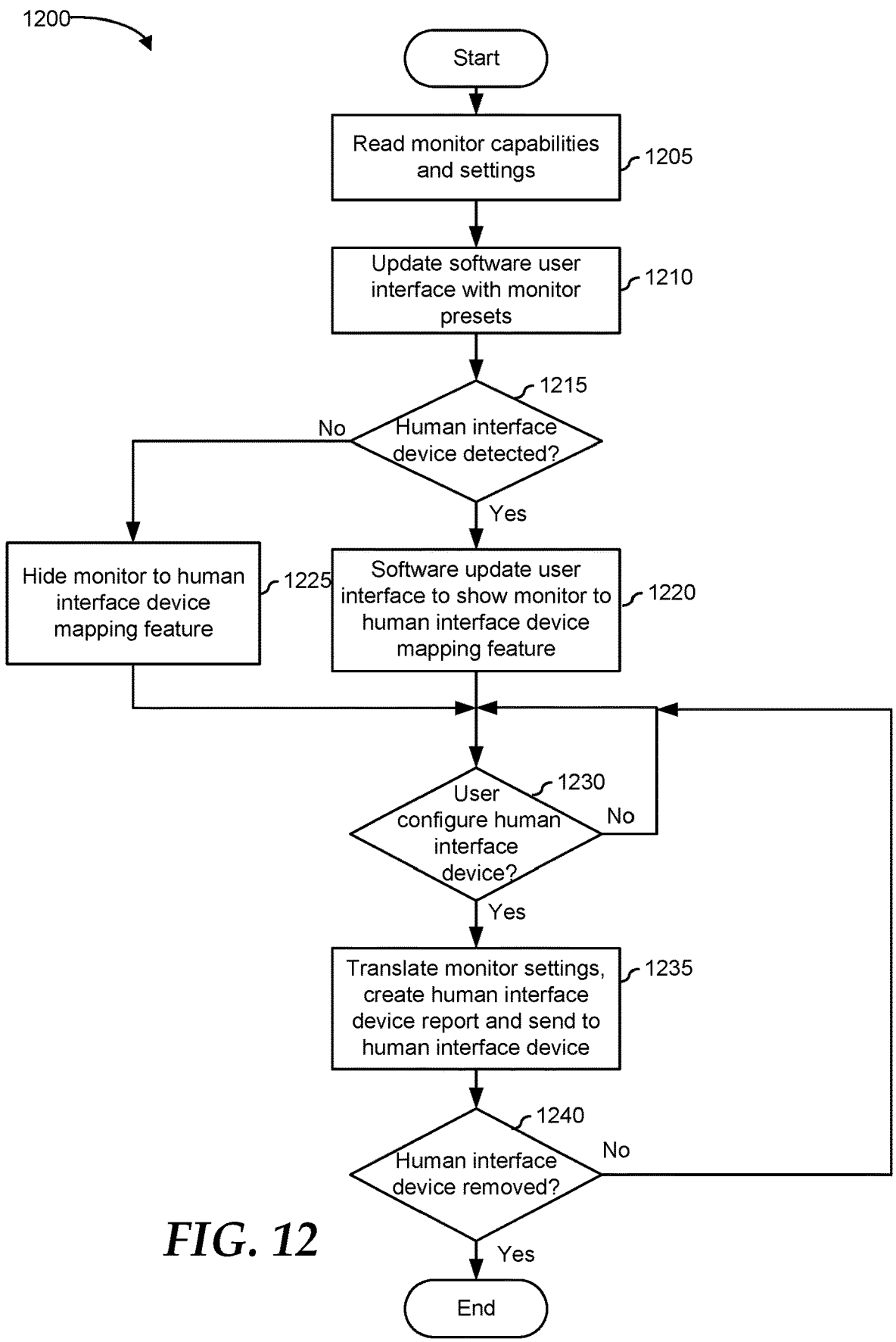
FIG. 12 is a flowchart illustrating a method for portability and switching of personalized monitor profiles, according to an embodiment of the present disclosure.

FIG. 12 shows a flowchart of a method 1200 for storing personal profiles in a human interface device. Method 1200 may be performed by an on-screen display interface associated with an on-screen display control software such as on-screen display software 325 of FIG. 3. While embodiments of the present disclosure are described in terms of components of system 200 of FIG. 2 it should be recognized that other systems may be utilized to perform the described method. One of skill in the art will appreciate that this flowchart explains a typical example, which can be extended to advanced applications or services in practice.

Method 1200 typically starts at block 1205, where the on-screen display control software determines the capabilities and settings of a monitor. The method proceeds to block 1210 where the method updates the monitor settings with his personalized monitor profiles using a user interface of the on-screen display control software. The user may update the monitor settings to his preferences using a user interface similar to on-screen display interface 400 of FIG. 4.

The method proceeds to decision block 1215, where the method determines whether a human interface device is detected. The method may detect the human interface device when it is plugged into a port, such as a USB port. The human interface device may be a USB device or something similar. The method may parse a human interface device report descriptor to identify a device description and determine the class of the human interface device. If the method detects the human interface device then the "YES" branch is taken and the method proceeds to block 1220. If the method does not detect the human interface device, then the "NO" branch is taken and the method proceeds to block 1225.

At block 1220, the method updates the on-screen display interface associated with the on-screen display control software to show a monitor to human interface device mapping feature referred herein simply as a mapping feature. For example, the method may activate a save button to show that the mapping feature is enabled. The method proceeds to decision block 1230. At block 1225, the method updates the on-screen display interface to the human interface device or disables the mapping feature such as by deactivating or greying out the save button. The method proceeds to decision block 1230.

At decision block 1230, the method determines whether the user accesses the mapping feature to configure the human interface device such as to store the personalized monitor profile. For example, the method may detect whether the user clicked the save button. If the method determines that the user accessed the mapping feature in the user interface, then the "YES" branch is taken and the method proceeds to block 1235. If the method determines that the user did not access the mapping feature in the user interface, then the "NO" branch is taken and the method loops back to decision block 1230. At block 1235, the method translates, converts, or encodes the personalized monitor profiles and generates binary data. The method may also generate a human interface device report and embed the binary code. The method sends the human interface device report to the human interface device for storage. The method proceeds to decision block 1240. At decision block 1240, the method determines whether the human interface device detected earlier is removed from the port or interface. If the human interface device is removed, the "YES" branch is taken and the method ends. If the human interface device is not removed, then the "NO" branch is taken and the method proceeds to decision block 1230.

Figure 13:
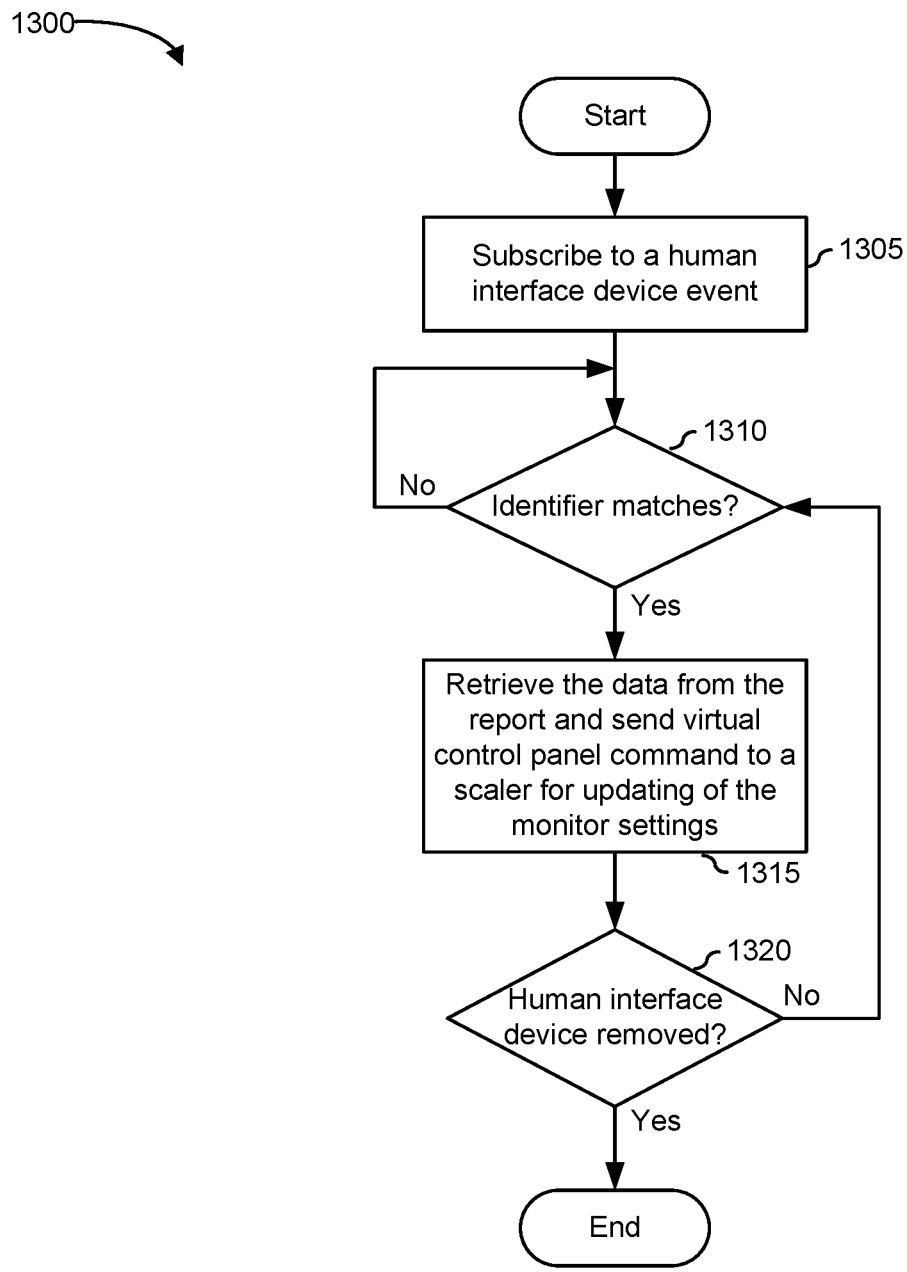
FIG. 13 is a flowchart illustrating a method for portability and switching of personalized monitor profiles, according to an embodiment of the present disclosure.

FIG. 13 shows a flowchart of a method 1300 for recalling and updating monitor settings with personalized monitor profiles that were stored in a human interface device. Method 1300 may be performed by an on-screen display control software. As an example, the on-screen display control software may be included in a display controller such as display controller 335 of FIG. 3. While embodiments of the present disclosure are described in terms of components of system 300 of FIG. 3 it should be recognized that other systems may be utilized to perform the described method. One of skill in the art will appreciate that this flowchart explains a typical example, which can be extended to advanced applications or services in practice.

Method 1300 typically starts at block 1305, where the on-screen display control software subscribes to an event generated by a human interface device. For example, the human interface device may generate an event that includes a report structure when a shortcut key is invoked such as when the user presses and/or releases a button or combination of buttons of a mouse, keyboard, game controllers, etc. Each press and/or release of each button generates a "button event." The human interface device event can be associated with a touch, a gesture, a voice command, a keystroke, a mouse movement, etc. that is capable of conveying an input to a human interface device. The on-screen display software interprets the human interface device report and determines the shortcut key such as button and/or key presses associated with the event and associated human interface device report identifier.

The method proceeds to decision block 1310 where the method determines whether the event includes a human interface device report identifier that matches a predefined report identifier. For example, the method determines whether a shortcut key is invoked by the user. For example, the method determines whether a human interface device event includes a human interface device report identifier that matches a predefined identifier and/or USAGE_PAGE and/or USAGE is detected, wherein the USAGE_PAGE, USAGE, USAGE_MINIMUM, and/or USAGE_MAXIMUM are associated with a programmable feature stored in the human interface device. If an identifier match is detected, then the "YES" branch is taken and the method proceeds to block 1315. If an identifier match is not detected, then the "NO" branch is taken and the method loops back to decision block 1310.

At block 1315, the method may determine the monitor settings associated with the shortcut key that was invoked by the user by using one or more lookup tables, such as tables 7-9 above. The method may generate transmit a virtual control panel command associated with a programmed action to update one or more monitor settings to the monitor scaler which updates the monitor settings accordingly. In particular, the method retrieves the binary data associated with the identifier from the human interface device report, creates a virtual control panel code, and sends the virtual control panel command to the monitor scaler which updates the monitor settings in the display screen and on the on-screen display interface control software. For example, if the event detected is associated with the forward button and scroll wheel as depicted in table 2 above, then the brightness level of the display screen may be adjusted.

The method proceeds to decision block 1320, where it determines whether the human interface device is removed from the interface. If the human interface device is removed, then the "YES" branch is taken and the method ends. If the human interface device is not removed, then the "NO" branch is taken and the method proceeds to decision block 1310.

Although FIG. 9, FIG. 10, FIG. 11, FIG. 12, and FIG. 13 show example blocks of method 900, method 1000, method 1100, method 1200, and method 1300 in some implementations, method 900, method 1000, method 1100, method 1200, and method 1300 may include additional blocks, fewer blocks, different blocks, or differently arranged blocks than those depicted in FIG. 9, FIG. 10, FIG. 11, FIG. 12, and FIG. 13. Additionally, or alternatively, two or more of the blocks of method 900, method 1000, method 1100, method 1200, and method 1300 may be performed in parallel. For example, block 1030 and block 1025 of method 1000 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium"

includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   saving, by a processor, a user configured monitor setting in a human interface device via a first interface bypassing a host, wherein the user configured monitor setting is mapped to a shortcut key associated with the human interface device, wherein the user configured monitor setting is associated with a first monitor that is associated with the host, and wherein the human interface device is coupled to the first monitor via the first interface; and
   in response to detecting activation of the shortcut key associated with the human interface device, retrieving the user configured monitor setting fronn the human interface device and applying the user configured monitor setting that is associated with the first monitor to a second monitor via a second interface bypassing the host, and wherein the human interface device is coupled to the second monitor via the second interface.

2. The method of claim 1, wherein the shortcut key includes a programmable button of the human interface device.

3. The method of claim 1, wherein the shortcut key further includes a programmable scroll wheel of the human interface device.

4. The method of claim 1, further comprising mapping another shortcut key to a set of monitor settings.

5. The method of claim 1, wherein mapping the user configured monitor setting to the shortcut key is performed using an on-screen display control software.

6. The method of claim 1, further comprising generating a data set structure for mapping the shortcut key to a set of monitor settings.

7. The method of claim 6, wherein the set of monitor settings is converted to binary data.

8. The method of claim 7, wherein the binary data is used as an index in determining the set of monitor settings.

9. The method of claim 7, wherein the binary data has a length of k-bits, wherein k is a natural number.

10. The method of claim 9, wherein the length of the k-bits is based on a mapping category between the user configured monitor setting and the shortcut key.

11. An information handling system, comprising:
    a processor; and
    a memory device storing code, the code when executed causing the processor to perform operations including:
    saving a user configured monitor setting in a human interface device via a first interface bypassing the information handling system, wherein the user configured monitor setting is mapped to a shortcut key associated with the human interface device, and wherein the user configured monitor setting is associated with a first monitor that is associated with the information handling system, and wherein the human interface device is coupled to the first monitor via the first interface; and
    in response to detecting activation of the shortcut key associated with the human interface device, applying the user configured monitor setting that is associated with the first monitor to a second monitor via a second interface bypassing the information handling system, and wherein the human interface device is coupled to the second monitor via the second interface.

12. The information handling system of claim 11, the operations further comprising generating a data set structure for mapping the shortcut key to a set of monitor settings.

13. The information handling system of claim 12, wherein the set of monitor settings is converted to binary data with a length of k-bits, wherein k is a natural number.

14. The information handling system of claim 13, wherein the length of the k-bits is based on a mapping category between the set of monitor settings and the shortcut key.

15. The information handling system of claim 11, wherein the shortcut key includes a programmable button of the human interface device.

16. A non-transitory computer readable media to store instructions that are executable to perform operations comprising:
    saving a user configured monitor setting in a human interface device via a first interface bypassing a host, wherein the user configured monitor setting is ma pped to a shortcut key associated with the human interface device, wherein the user configured monitor setting is associated with a first monitor that is associated with the host, and wherein the human interface device is coupled to the first monitor via the first interface; and
    in response to detecting activation of the shortcut key associated with the human interface device, retrieving the user configured monitor setting and applying the user configured monitor setting that is associated with the first monitor to a second monitor via a second interface bypassing the host, and wherein the human interface device is coupled to the second monitor via the second interface.

17. The non-transitory computer readable media of claim 16, the operations further comprising generating a data set structure for mapping the shortcut key to a set of monitor settings, wherein the set of monitor settings is converted to binary data.

18. The non-transitory computer readable media of claim 17, wherein the binary data has a length of k-bits, wherein k is a natural number.

19. The non-transitory computer readable media of claim 18, wherein the length of the k-bits is based on a mapping category of between the user configured monitor setting and the shortcut key.

20. The non-transitory computer readable media of claim 16, wherein the shortcut key includes a programmable button of the human interface device.

* * * * *